June 27, 1950     O. W. OERMAN     2,512,962
DISK PLOW
Filed Nov. 1, 1944     3 Sheets-Sheet 1
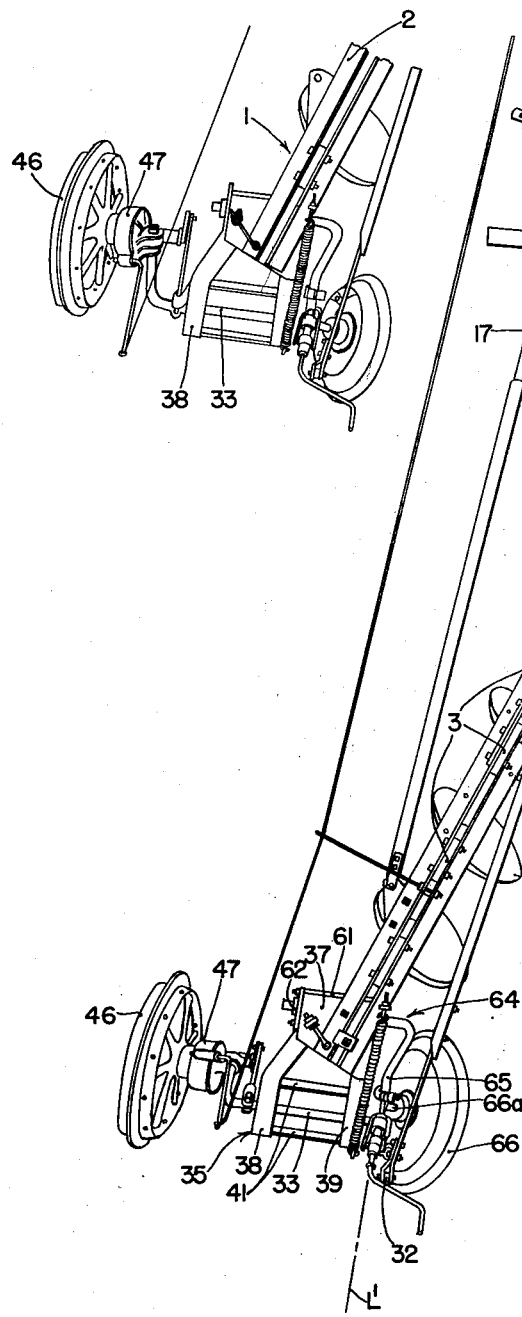
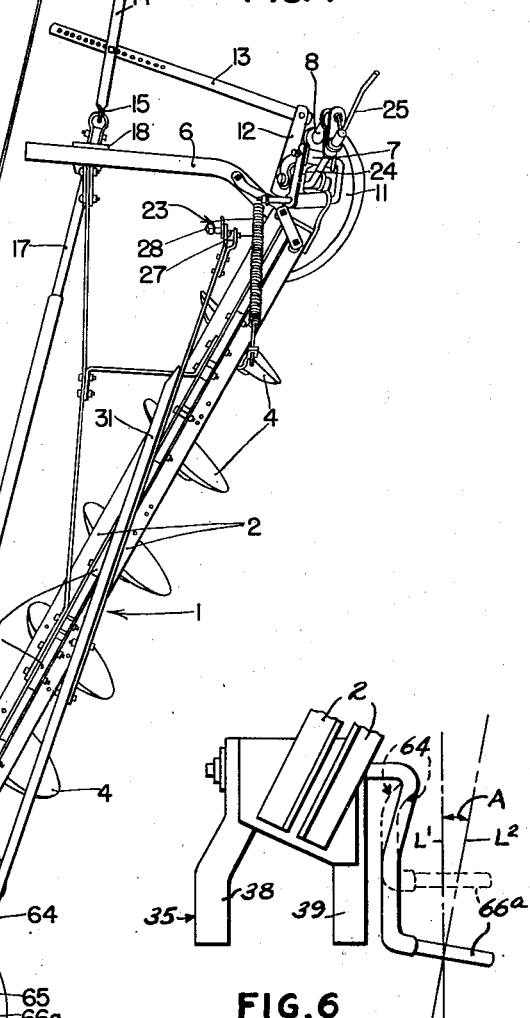
FIG. 4.
FIG. 1
FIG. 6
*INVENTOR.*
OREY W. OERMAN
ATTORNEYS

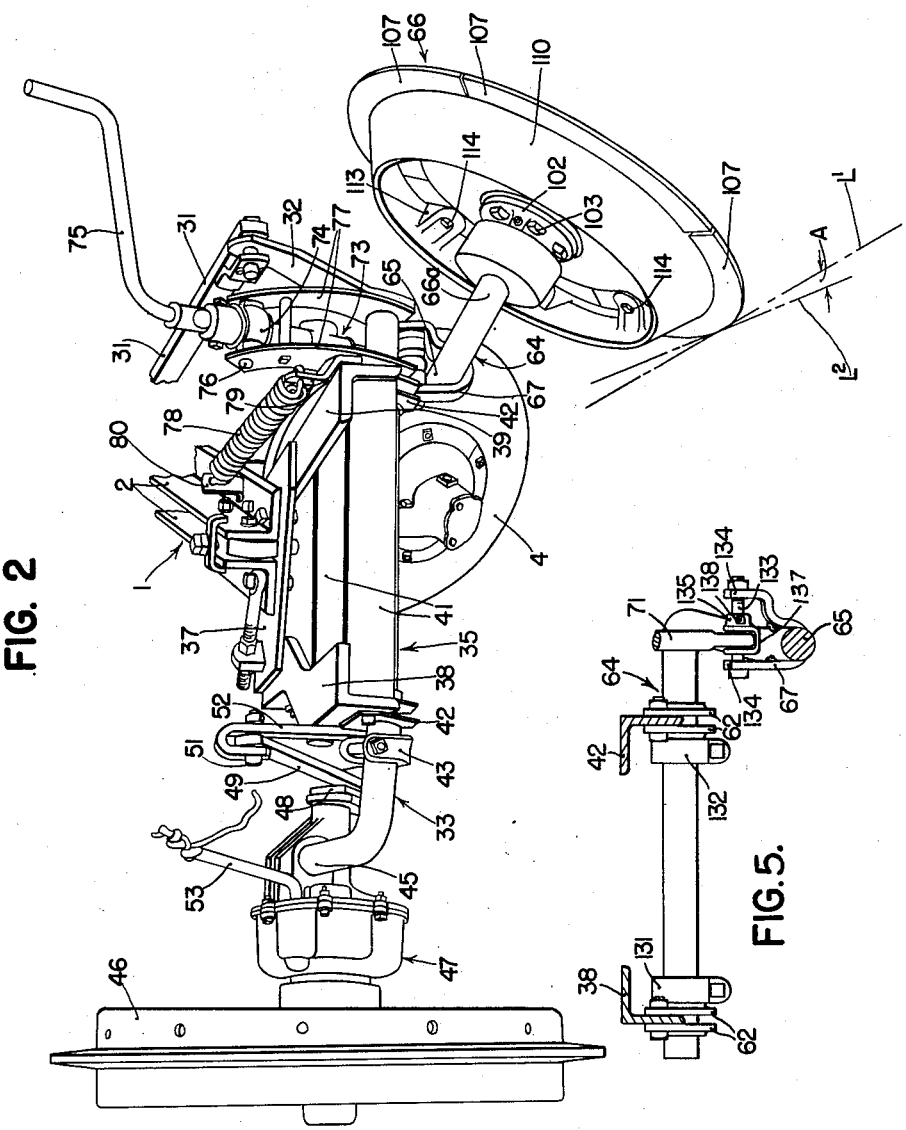

June 27, 1950        O. W. OERMAN        2,512,962
DISK PLOW
Filed Nov. 1, 1944        3 Sheets-Sheet 3
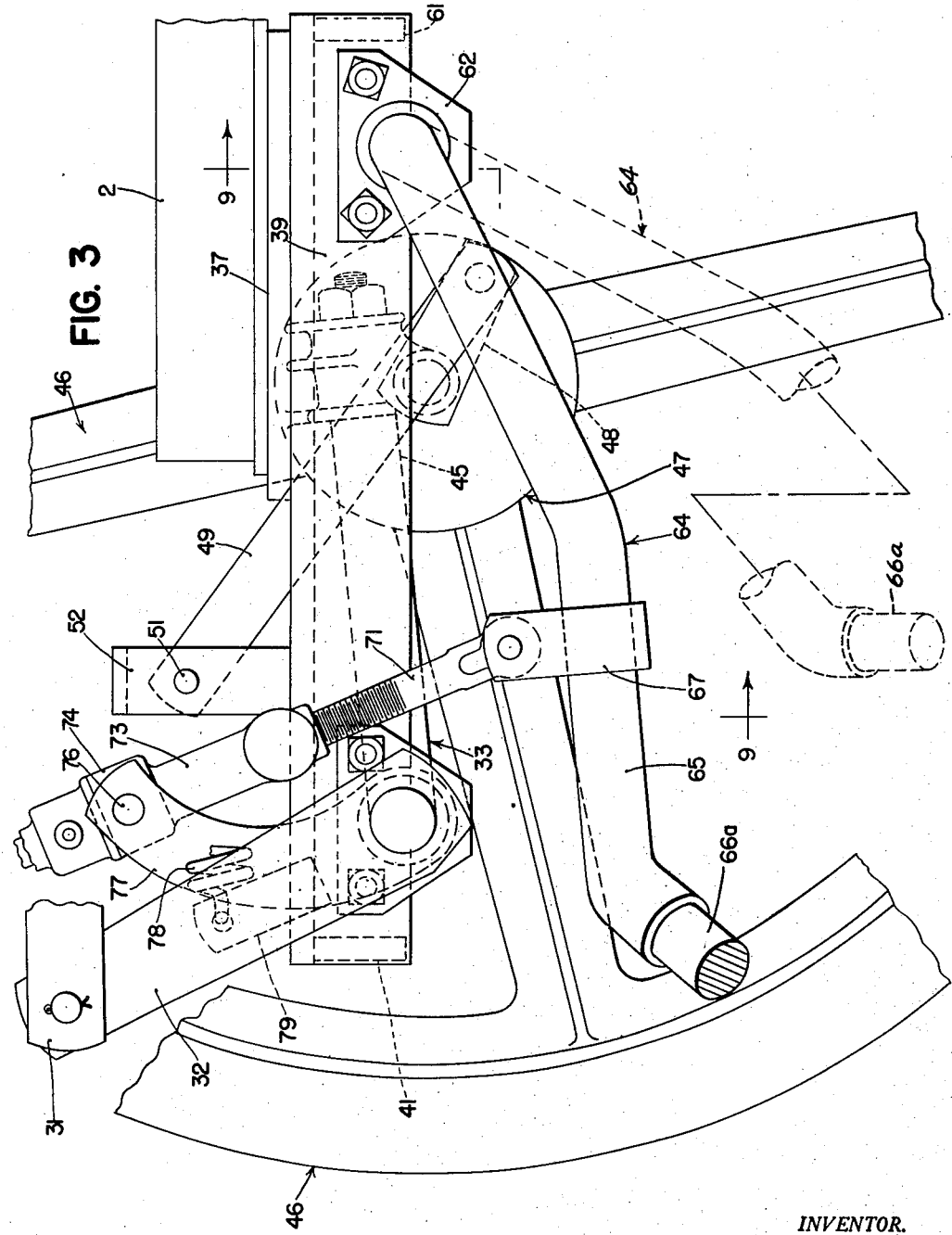
INVENTOR.
OREY W. OERMAN
ATTORNEYS Patented June 27, 1950

2,512,962

UNITED STATES PATENT OFFICE 2,512,962

DISK PLOW

Orey W. Oerman, Moline, Ill., assignor to Deere & Company, Moline, Ill., a corporation of Illinois Application November 1, 1944, Serial No. 561,432

5 Claims. (Cl. 97—102)

The present invention relates generally to agricultural implements and more particularly to implements in the nature of disk plows.

The object and general nature of the present invention is the provision of a new rear end construction for disk plows and similar implements especially adapted for simplicity and ease of construction and operation, particularly in the matter of adjusting the plow for different depths of operation and for raising and lowering the plow into and out of its transport position. Specifically, one feature of the present invention is the provision of a new and improved rear end construction in which the rear furrow wheel is particularly mounted so as to lead away from the land and toward the previously opened furrows with an angular lead of approximately three or four degrees, and still further, it is a feature of this invention to reduce the lead of the rear furrow wheel to substantially zero when the plow is raised into its transport position. Further, it is a feature of this invention also to provide a particular kind of rear furrow wheel so constructed and arranged as to have a longer life and to bite into the furrow bottom to a greater degree so as to utilize to best advantage the angular lead of the rear furrow wheel in operation so as to keep the rear end of the plow from swinging around landwardly out of the proper angular position.

These and other objects and advantages of the present invention will be apparent to those skilled in the art after a consideration of the following description, taken in conjunction with the accompanying drawings in which the preferred forms of the present invention have been illustrated.

In the drawings:

Figure 1 is a plan view showing a disk plow in which the principles of the present invention have been incorporated.

Figure 2 is a perspective view showing certain details of the rear end construction.

Figure 3 is an enlarged fragmentary side view of the rear end of the plow shown in Figure 1 taken from the right side and with the rear furrow wheel removed and other parts broken away, the transport position of the rear furrow wheel crank axle being shown in dotted lines, and showing in detail certain features of the adjusting means for the rear axle.

Figure 4 is a fragmentary view, similar to Figure 1, showing the position of the rear end parts of the plow when the latter is in an operating position.

Figure 5 is a sectional view taken generally along the line 9—9 of Figure 3, showing the adjustable furrow wheel axle.

Figure 6 is a diagrammatic view illustrating how the lead angle is reduced to zero when the plow is raised to its transport position.

Referring now to the drawings, the reference numeral 1 indicates the frame of a disk plow in which the principles of the present invention have been illustrated. The frame 1 includes a pair of angles 2 connected together in back-to-back relation with a plurality of disk standards 3 clamped therebetween, the lower ends of the disk standards having disks 4 rotatable thereon. The frame 1 also includes a laterally outwardly directed frame bar section 6 at the front end of the angles 2 and, in addition, a casting 7 in which the vertical portion 8 of a wheel spindle is shiftable, the arrangement being similar to that shown in U. S. Patent 2,243,989 issued June 3, 1941, to Carl G. Strandlund and U. S. Patent 1,627,902, issued May 10, 1927, to John V. Holstein. The present invention is not particularly concerned with the front furrow wheel mounting and therefore a brief description will suffice. The lower end of the wheel spindle receives a front furrow wheel 11 and has a forwardly extending arm 12 connected by a link 13 to a hitch bar 14 that is pivotally connected, as at 15, to the front end of a draft bar 17. The latter is supported in a bracket 18 bolted to the laterally outer end of the frame section 6 and at its rear end to the rear portion of the main frame angles 2. A bell crank 23 is pivotally mounted on the casting 7 or a part adjacent thereto and is connected by an adjustable link 24 to the upper end of the wheel spindle section 8 whereby rocking movement of the bell crank 23 raises or lowers the front end of the frame relative to the front wheel spindle. The connecting link 24 is adjustable by means of a crank screw 25. An arm 27 on a part, such as a shaft 28, connected to or forming the part of the bell crank 23, extends upwardly and has connected thereto a generally longitudinally extending link member 31 which at its rear end is pivotally connected to the upper end of an arm 32 that is secured, as by welding, to the furrowward end of a land wheel crank axle 33. The latter is swingably connected with the rear end of the frame bars 2 by a rear frame section indicated in its entirety by the reference numeral 35 and which comprises a plate 37 adjustably bolted to the rear ends of the angles 2 and to which a pair of frame angles 38 and 39 are secured, as by welding. The rear portions of the angles 38 and 39 are connected by cross bars 41. Secured, as by bolts or the like, to the rear ends of the angles 38 and 39, are brackets 42 in which the crank axle 33 is swingably mounted. A collar 43 at one end and the arm 32 and associated parts at the other end of the crank axle 33, serve to hold the latter against lateral displacement with respect to the plow frame.

The crank axle 33 includes a forwardly extending section 45 which carries a land wheel 46 and a land wheel driven self-interrupting clutch unit 47. The latter unit includes a swingable arm 48 which is connected by a link 49 to a pivot bolt 51 carried by a bracket 52 that is fixed permanently, as by welding or the like, to the left rear frame angle 38. The clutch mechanism 47 is controlled by a trip lever 53, and whenever the latter is actuated the crank arm 48 is rotated by the rotation of the land wheel 46 through approximately a half revolution. Since the upper end of the link 49 is connected to the bracket 52 fixed to the frame, the swinging of the crank arm 48, as just mentioned, causes the crank axle 33 to swing, carrying with it the arm 32 which, through the longitudinally extending link 31, raises and lowers the front end of the frame relative to the front wheel spindle 8.

The front ends of the rear frame angles 38 and 39 are connected together by a cross bar 61, and adjacent the latter member are brackets 62 in which a furrow wheel crank axle 64 is swingably mounted. The crank axle 64 includes a rearwardly directed wheel receiving section 65 which terminates in a spindle part 66a (Figures 2 and 3) on which a furrow wheel 66 is mounted. A bracket 67 is clamped to the section 65 of the furrow wheel crank axle 64 and pivotally receives a screw-threaded member 71. Threadedly engaged with the latter member is a rotatable sleeve 73 carried in a trunnion member 74 and actuated by an adjusting crank 75. The trunnion 74 is pivoted, as at 76, to the upper ends of a pair of arms 77 which are fixed to the furrowward end of the land wheel crank axle 33, preferably adjacent, or actually secured, as by welding, to the arm 32 and the crank axle 33. Thus, the arms 77, being secured together, and also to the arm 32, constitute with the latter parts a single swingable member operated by the swinging movement of the land wheel crank axle 33. An assisting spring 78 is anchored at its rear end to a lug 79 welded to the inside arm 77 and at its forward end is connected to a lug 80 bolted to one of the main frame angles, as best shown in Figure 2, to aid in raising the plow.

It will be noted that through the link 49 and the self-interrupting clutch unit 47, the crank axle 33 is adapted to be swung between two predetermined positions relative to the frame, there being no adjustment for either of these positions, and it will also be noted that by virtue of this predetermined amount of swinging of the land wheel crank axle 33, the front and rear furrow wheels 11 and 66 may be raised and lowered by power derived from the forward traction of the outfit. Since the land wheel 46 is disposed well to one side of the disks 4 and the front and rear furrow wheels are disposed practically in line with the disks 4, it will be seen that the raising and lowering of the frame relative to the furrow wheels raises and lowers the disks between their operating and transport positions. The position of the rear furrow wheel relative to the other wheels, and also relative to one of the predetermined positions of the land wheel crank axle 33, may be adjusted by turning the crank 75 in one direction or the other. For example, when the farmer desires to plow somewhat deeper, he turns the crank screw 75 in a direction to raise the rear furrow wheel 66 slightly above the level of the disks, thus adding more weight to the rear of the frame and causing the disks to penetrate to a greater degree. Also, the raising of the rear furrow wheel 66 also increases the depth of plowing since, in any given position, the wheel 66 limits the downward movement of the plow.

Referring now particularly to Figures 1 and 2, it will be observed that the wheel receiving section 66a of the rear furrow wheel crank axle 64 is so angled that when the parts are in their operating position (Figures 2 and 4) the plane of the wheel intersects the ground along the line $L^1$ (Figure 2) that angles outwardly with respect to the direction of forward advance line $L^2$ (Figure 2). This angle is indicated in Figure 2 at A and is referred to as an angle of lead, since the function of disposing the rear furrow wheel in this manner, leading off to the furrowward side of the plow, is to offset the tendency for the rear end of the plow to swing around to the left and forward, due to the curvature of the disks. The angle of lead which is built into the plow is such as to positively hold the rear end of the plow against such lateral displacement, and according to the present invention this is done not only by providing the amount of lead above referred to, but also by providing a special wheel construction in which the radial flange of the wheel is so constructed and arranged as to bite into the soil with a positive action, thus making the above-mentioned lead actually effective for the purpose for which it is used. Further, the section 66a of the crank axle 64 is so shaped, as best shown in Figures 3 and 6, that when the plow is raised (Figure 1) the amount of lead is reduced to zero and the line $L^1$ coincides with the line $L^2$. Further, the rear furrow wheel 66 is swung forwardly while the land wheel 46 is swung rearwardly, the parts being so constructed that when the plow is in its transport position the wheels 46 and 66 are substantially opposite one another. Since now the lines along which the planes of the rear land and furrow wheels intersect the ground are parallel to each other and to the line of forward advance, the plow trails for transport without tending to swing to one side or the other.

As mentioned above, in order to make the lead angle A (Figure 2) effective when in operation, it is necessary that the rear furrow wheel 66 be provided with a flange that actually cuts into the furrow bottom a distance sufficient to give the wheel a purchase on the ground so as to hold the rear end of the disk from swinging around to the left and forwardly. The preferred wheel construction for this purpose is shown and claimed in my divisional application, Serial No. 638,023, filed December 29, 1945. Briefly, the rear wheel construction shown in Figure 2 includes a wheel receiving section 66a formed on or carried by the rear furrow wheel crank axle 64. The main body or web of the wheel 66 is secured to the flange 102 of the hub by bolts 103 or the like, and the earth-engaging flange of the wheel is made up of segmental planar plates 107 which are clamped to the main body or web of the wheel by means that includes a plate-clamping conical rim section 110. The latter has a plurality of apertured inwardly extending lugs 113, and bolts 114 are passed through the openings in the lugs 113, the plates 107 and the peripheral portion of the wheel body, so that when the bolts are tightened the segmental plates 107 are clamped rigidly and firmly between the rim member 110 and the outer portion of the main web of the wheel body.

The operation of the present invention is substantially as follows:

When opening up the land, the operator turns the front and rear crank adjusting screws 25 and 75 so as to raise the furrow wheels a distance substantially equal to the depth of furrow desired. Generally, however, the front adjusting screw 25 is not turned enough to raise the front furrow wheel as far as the rear furrow wheel. This is to prevent the front disks from cutting in too much and tending to cause the rear end of the plow to swing around to the left. After the first round has been completed, the front and rear furrow wheels are readjusted to bring them substantially to the level of the lower edges of the disks. The land wheel 46 is not adjusted, but at the end of the field the plow may readily be raised by operating the clutch trip lever 53 which causes the land wheel crank axle to be swung through a predetermined angle which, at the same time, acts to raise the front and rear ends of the plow frame with respect to the front and rear furrow wheels. If at any time during operation, the operator desires to increase the depth of plowing, usually all that it is necessary to do is to turn the rear crank screw 75 in a direction to raise the rear furrow wheel 66 slightly above the furrow bottom. This has the effect of increasing the depth of operation of the rear disks, but generally the farmer does not desire to have the front disks the first time around operate at the new depth, it being preferable to leave the front disks at their previous adjustment for the same reason as pointed out above, namely, to eliminate any tendency for the rear end of the plow to swing around toward the landward side. After the first time around with the readjusted depth of operation completed, the rear furrow wheel 66 is then readjusted to a position on the level with the lower edges of the disks.

When in operating position the wheel 66, with its extended planar flange cuts into the bottom of the furrow a sufficient depth to insure that the angle of lead offsets any tendency for the rear end of the plow to swing around to the left. When the plow is raised into its transport position, the rear crank axle 66a is so formed that the lead of the rear furrow wheel is reduced to zero, bringing the tracks of the wheels 46 and 66 into parallelism. This steadies the plow and prevents whipping and lateral displacement when traveling during transport.

Under certain conditions, such as when the ground is fairly hard, there is a tendency for the rear end of the plow to swing too far over to the landward side so that the rear land wheel 46 is not disposed directly in the line of travel. Under other conditions, such as when the ground is quite soft, the tendency is for the rear end of the plow to swing too far to the right so that, again, the land wheel 46 may not trail properly. In order to provide for a measure of adjustment, I mount the furrow wheel crank axle 64 in the brackets 62, and I also connect the lower end of the adjusting screw 71, in a manner to provide for shifting the furrow wheel axle 64 either inwardly or outwardly relative to the frame. To this end, I provide the furrow wheel crank axle with a pair of clamp collars 131 and 132 and I form the bracket 67 with an elongated pin 133 disposed between fairly widely spaced sections 134 of the bracket 67. The lower end of the adjusting screw 71 is disposed in an adjusting collar 135 which is provided with an extension 137 that embraces the lower end of the screw 71. The clamp collar 135 is provided with a set screw 138 or the like by which the collar 135 may be fixed in different positions along the pin 133. The collars 131 and 132 may be loosened and the axle 64 shifted laterally to different positions, depending on whether it is desired to have the furrow wheel 66 disposed to ride firmly against the furrow wall, as would be desirable where the ground is hard, or to ride farther out forwardly, as would be desirable when the ground is soft. By shifting the clamp collar 135 to different positions, corresponding to the adjustment of the crank axle 64 just mentioned, the proper position of the link 71 relative to the other parts of the adjusting mechanism is maintained.

While I have shown and described above the preferred structure, in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a disk plow having front and rear furrow wheels, a land wheel, and frame means with respect to which said front furrow wheel is adjustable, a rear end construction comprising a rear end frame section, a land wheel crank axle swingably connected with the rear portion of said frame section and carrying said land wheel at one side of said frame section, a rear furrow wheel crank axle swingably connected with the front section of said frame section, a pair of arms fixed to said land wheel crank axle adjacent one another at the furrowward side of the plow, one of said arms being substantially over the rear portion of said rear furrow wheel crank axle, means connected with the other of said arms for shifting said plow frame relative to said front furrow wheel, and an adjustable connection between said one arm and said rear portion of the rear furrow wheel crank axle.

2. In a disk plow, a rear end structure comprising means serving as a support, a pair of laterally spaced brackets carried thereby, a crank axle swingably mounted in said brackets, means for adjustably holding said crank axle against lateral displacement relative to said support, means for raising and lowering said crank axle and including a member adapted to act against said crank axle at a point spaced from its axis of swinging in said brackets, and means including a part connected to said crank axle and having two laterally spaced sections, either adapted to operatively receive said member, for adjustably connecting the latter with the crank axle so as to change the point of connection between said member and said crank axle when the latter is adjusted relative to said brackets.

3. In a disk plow, a rear end structure comprising means serving as a support, a furrow wheel crank axle swingably connected with said support, a land wheel crank axle swingably connected with said support, wheels mounted on said crank axles, said land wheel crank axle having a wheel-receiving section extending substantially parallel to and normally disposed forward of the axis of swinging of said land wheel axle and arranged so that the land wheel is disposed in a plane substantially perpendicular to the ground, said furrow wheel having a rim carrying a peripheral flange sufficiently narrow to cut into the furrow bottom along which it passes, said furrow wheel crank axle having a wheel-receiving section normally disposed rearwardly of the axis of swinging of said furrow wheel crank axle, and means to raise said support by swinging the wheel-receiving sections of said crank axles toward one another into positions in which said wheels are disposed substantially opposite one another, said furrow wheel crank axle having its wheel-receiving section disposed at such an angle that when the plow is in a lowered position said wheel-receiving section lies substantially in a vertical plane that extends laterally outwardly and rearwardly whereby the furrow wheel is disposed so that the plane of the peripheral flange thereof intersects the ground with a lead toward the previously formed furrow, the angle of said wheel-receiving section being such that, when the crank axles are swung substantially into said positions, in which said wheels are disposed opposite one another, the vertical plane passing through the wheel-receiving sections of said furrow wheel crank axle is substantially perpendicular to the direction of travel and generally parallel to the axis of swinging of said land wheel crank axle, whereby said lead is reduced to zero when the furrow wheel comes into a position opposite the land wheel, the plane of said flange then intersecting the ground along a line parallel to the plane of said land wheel.

4. In a plow or the like, a frame, a shiftable front wheel, a land wheel crank axle swingably connected with said frame and having at one side of said frame a cranked end and a land wheel rotatable thereon, a pair of arms at the other side of said frame fixed to the other end of said crank axle, a rear furrow wheel crank axle swingably connected with said frame and having at said other side of said frame a cranked axle and a rear wheel thereon, a first connection between one of said arms and said shiftable front wheel, and a second connection between the other of said arms and said rear furrow wheel crank axle.

5. The invention set forth in claim 4, further characterized by said second mentioned arm comprising a pair of laterally spaced arm sections, and said second connection comprising a trunnion carried by said spaced apart arm sections, and adjustment means extended between said trunnion and said rear furrow wheel crank axle for adjusting the position of the latter relative to said land wheel crank axle.

OREY W. OERMAN.

REFERENCES CITED

The following references are of record in the file of this patent:

UNITED STATES PATENTS

| Number | Name | Date |
| --- | --- | --- |
| 692,805 | Waterman | Feb. 4, 1902 |
| 1,099,337 | Buchanan | June 9, 1914 |
| 1,130,732 | Hirshheimer | Mar. 9, 1915 |
| 1,207,443 | Smith | Dec. 5, 1916 |
| 1,234,761 | Heylman | July 31, 1917 |
| 1,275,209 | Bohmker et al. | Aug. 13, 1918 |
| 1,349,028 | Waterman | Aug. 10, 1920 |
| 1,377,064 | Gallagher | May 3, 1921 |
| 1,500,046 | Howard | Aug. 5, 1924 |
| 1,823,969 | Davis | Sept. 22, 1931 |
| 1,885,955 | Silver | Nov. 1, 1932 |
| 1,892,753 | Strandlund | Jan. 3, 1933 |
| 2,243,989 | Strandlund | June 3, 1941 |
| 2,380,323 | Morkoski | July 10, 1945 |

FOREIGN PATENTS

| Number | Country | Date |
| --- | --- | --- |
| 112,245 | Australia | Dec. 30, 1940 |